United States Patent [19]

Ford

[11] E Re. 30,858

[45] Reissued Feb. 2, 1982

[54] IGNITION SYSTEMS FOR INTERNAL COMBUSTION ENGINES

[75] Inventor: Eric H. Ford, London, England

[73] Assignee: Lumenition Limited, London, England

[21] Appl. No.: 946,435

[22] Filed: Sep. 27, 1978

Related U.S. Patent Documents

Reissue of:

[64] Patent No.: 3,605,712
Issued: Sep. 20, 1971
Appl. No.: 801,721
Filed: Feb. 24, 1969

[30] Foreign Application Priority Data

| | | | |
|---|---|---|---|
| Feb. 29, 1968 | [GB] | United Kingdom | 946/68 |
| Oct. 22, 1968 | [GB] | United Kingdom | 50102/68 |
| Nov. 19, 1968 | [GB] | United Kingdom | 54775/68 |

[51] Int. Cl.[3] ..... F02P 1/00; F02D 5/04

[52] U.S. Cl. ..... 123/651; 123/613; 123/408

[58] Field of Search ..... 123/148 E, 148 CB; 315/209 T

[56] References Cited

U.S. PATENT DOCUMENTS

| | | | |
|---|---|---|---|
| 2,071,641 | 2/1937 | Lunn | 64/25 |
| 2,084,267 | 6/1937 | Hicks | 123/146.5 A X |
| 2,659,353 | 11/1953 | Mallory | 123/117.1 |
| 2,787,649 | 4/1957 | Ballard et al. | 123/148 E |
| 2,791,724 | 5/1957 | Ekbloom | 123/148 E X |
| 3,072,823 | 1/1963 | Kirk | 123/148 E |
| 3,092,084 | 6/1963 | Thorner | 73/546 |
| 3,235,742 | 2/1966 | Peters | 123/148 E X |
| 3,368,539 | 2/1968 | Kidwell | 123/148 E |
| 3,390,668 | 3/1968 | Hufton | 123/148 E |
| 3,405,268 | 10/1968 | Brunton | 250/83.3 I |
| 3,406,672 | 10/1968 | Phillips | 123/148 E |
| 3,407,796 | 10/1968 | Hetzler | 123/148 E |
| 3,422,804 | 1/1969 | Van Mastrigt | 123/148 E |
| 3,473,067 | 10/1969 | Rittmayer | 250/217 SSL |
| 3,605,712 | 9/1971 | Ford | 123/148 E |

*Primary Examiner*—Ronald B. Cox
*Attorney, Agent, or Firm*—Michael, Best & Friedrich

[57] ABSTRACT

In an ignition system of an internal combustion engine the provision of a device for fast switching the primary circuit, this device including an infra-red radiation source and an infra-red radiation sensitive element, the radiation path being interrupted in timed relation to the engine revolutions whereby switching current is provided which is amplified for fast switching transistorized elements and applied to the primary winding of the ignition coil. Advance or retard of the ignition system can be achieved in relation to speed and/or load conditions on the engine by altering the line of sight between the radiation source and the radiation sensitive element in relation to a device which interrupts the radiation in timed relation to the engine revolutions.

10 Claims, 8 Drawing Figures

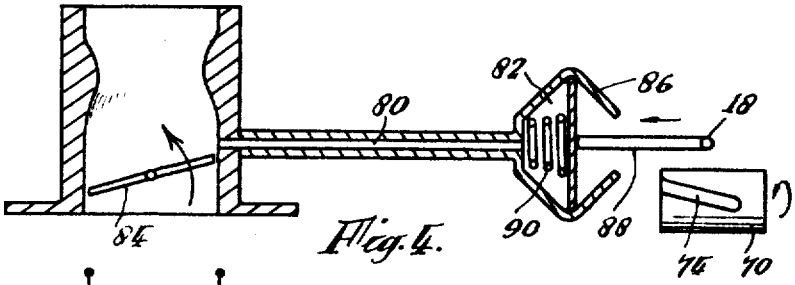
Fig. 4.
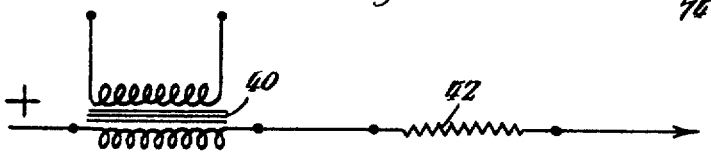
Fig. 5
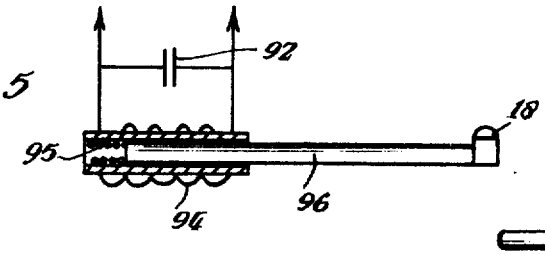
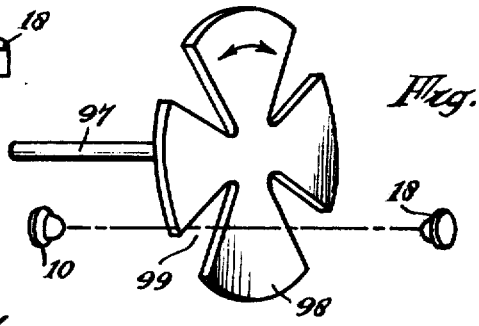
Fig. 6A.
Fig. 7.
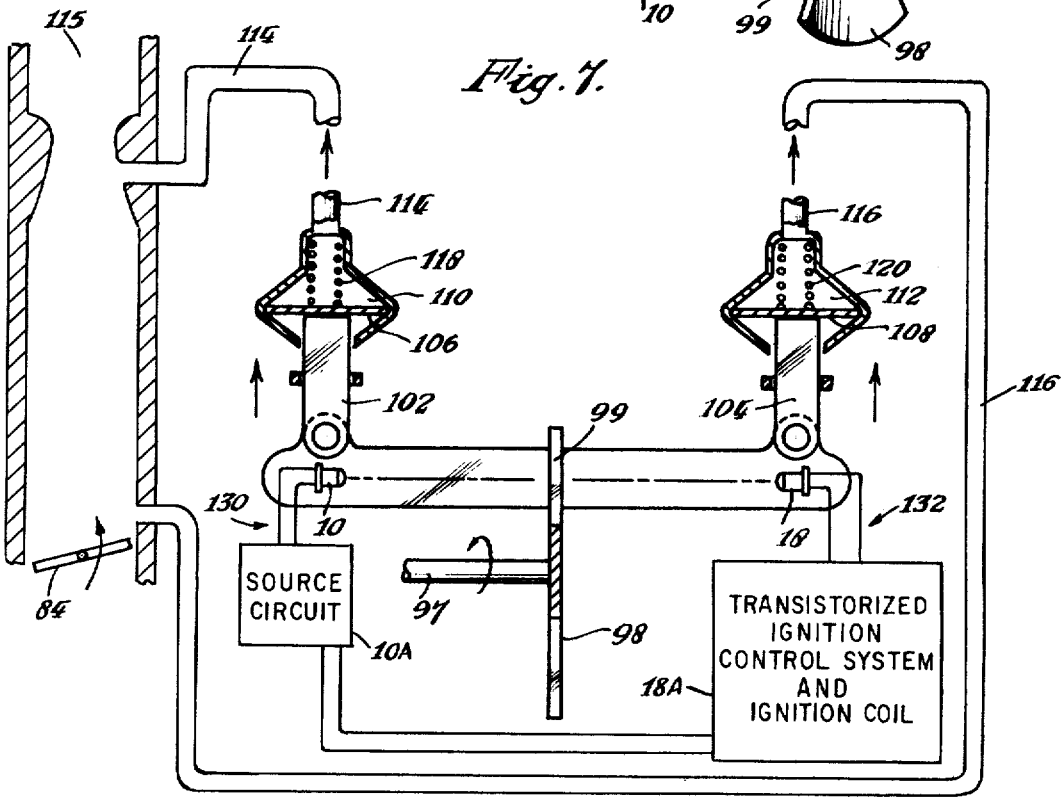

IGNITION SYSTEMS FOR INTERNAL COMBUSTION ENGINES

Matter enclosed in heavy brackets [ ] appears in the original patent but forms no part of this reissue specification; matter printed in italics indicates the additions made by reissue.

FIELD OF INVENTION

The present invention relates to improvements in ignition systems for internal combustion engines.

The usual form of ignition system for an internal combustion engine, such as a petrol engine relies on a contact breaker to interrupt the current and thus generate in the ignition coil a sufficient voltage pulse to pass across the gap between the contacts of the sparking plug in order to fire the combustible mixture compressed in the cylinder, the pulse being fed to the appropriate sparking plugs in timed sequence by a distributor. Such an ignition system relies on moving mechanical parts in circuit with the current to the primary winding of the ignition coil and these are liable to wear or to become out of correct adjustment.

DESCRIPTION OF PRIOR ART

It is well known that voltage pulses for use with an ignition system of an internal combustion engine can be generated by using a light source, a photo-sensitive device such as a photo-electric cell or photo-transistor, and a disc or drum with holes in it or an obscuring device rotated in synchronism with the engine revolutions. This principle is disclosed in the specifications of British Pat. No. 472,688 and No. 513,629. Both the systems described above employ gas filled thyratrons, the thyratrons being triggered by pulses produced by the photo-sensitive devices when they are activated, the thyratron on being triggered producing a voltage pulse of sufficient size to energize the primary winding of the ignition coil.

Another construction proposed in the specification of British Pat. No. 789,949 works on a somewhat different principle. As before, the ignition system includes a light source, a photo-transistor and a shutter which obscures the light from the source on rotation of a shaft to which the shutter is secured, the shaft being driven by the engine. The primary winding of the ignition coil is in series with the photo-transistor. When the light is cut off by the shutter, at the instant at which ignition is to occur, the resistance of the photo-transistor rises to a very high value so that the current through the primary winding is suddenly reduced to a very low value. The voltage induced in the secondary winding due to the rapid drop in primary current produces the desired voltage pulse for the ignition spark.

The above arrangements suffer from the following disadvantages.

(a) The use of thyratrons or other gas discharge tubes is unsatisfactory because these elements cannot withstand for any length of time the jolts and engine vibration to which they will be subjected to in a road vehicle.

(b) The omission of the thyratron, i.e. the direct coupling of the photo-transistor and the primary winding as proposed in Pat. No. 789,949 is not practical because at present there is no photo-transistor capable of switching the full primary current of an ignition system which can be any value up to 10 amperes.

(c) In the case of the circuit disclosed in Pat. No. 789,949 a serious problem would arise because of the slow rate at which the [photo-tarnsistor] *photo-transistor* would switch off, and hence the current reduction in the primary winding would be too slow in order to generate a high secondary voltage.

A further system uses interrupted light to switch the output of a condenser into a coil by means of a silicon controlled rectifier to produce a high frequency discharge.

*Another type of opto-electronic ignition system includes a photosensitive detector connected to the primary winding of the ignition coil through a plurality of transistors. Representative examples of such systems are disclosed in U.S. patents 3,235,742 (Peters) and 3,422,804 (Van Mastright). The system disclosed in the Peters patent includes a photovoltaic detector connected to a pair of p-n-p transistors which switch "on" and "off" together in response to de-energization and energization of the detector. The system disclosed in the Van Mastright patent includes a transistor which is connected in series with the primary winding of the ignition coil and is controlled by the output of a transistorized amplifier circuit which in turn is controlled by a photodiode. Adjacent pairs of transistors switch "on" and "off" together in alternate sequence.*

*Some magnetic-triggered systems have transistorized currents including at least two transistors which switch in inverse relation to one another. Representative examples of such circuits are disclosed in U.S. Patents 3,072,823 (Kirk), 3,390,668 (Hufton) and 3,406,672 (Phillips). These circuits are mono-stable, i.e., have only one stable state, and are momentarily triggered to the unstable state by a magnetically induced pulse. Magnetic triggered systems revert to the stable state in constant time. Consequently, at lower engine speeds, the circuit tends to revert to the stable state too quickly causing secondary voltage collapse before a spark has been established and, at higher speeds, there is insufficient time for the primary current to build up before the next spark is required.*

*A common problem with either opto-electronic or electromagnetic systems is the potentially damaging effect of transient voltages created across the primary coil during switching. It is well recognized that a non-conducting transistor can be damaged, or in extreme cases broken down, by high positive or negative transients imposed thereon. Accordingly, ignition systems who do operate in a manner to provide a short to ground at all times during switching are vulnerable to damage by transient voltages.*

It is therefore an object of the present invention to obviate the above disadvantages in both the conventional "contact-breaker" type of ignition system and the types of ignition system discussed above when voltage pulses are generated by the interruption of a light source *or by magnetic trigger.*

SUMMARY OF INVENTION

According to the present invention there is provided a device for fast switching the primary circuit of an ignition system of an internal combustion engine including a radiation sensitive element which will switch on or conduct when exposed to radiation, an infra-red radiation source, an opaque element positioned between the radiation source and the radiation sensitive element, said opaque element having at least one aperture therein, and means for moving the element in timed relation to the engine revolutions whereby a switching action is achieved for the ignition system in synchronism with the engine every time an aperture permits radiation to fall onto the radiation sensitive element.

Preferably the infra-red radiation source is a gallium arsenide lamp.

The output from the radiation sensitive element [may be applied to a circuit which includes at least one transistor amplifier means fed from the output of the radiation sensitive element, and a power transistor energized from the output of the amplifier means and feeding the ignition coil of the system.] *is connected to the ignition coil through a switching circuit including a plurality of transistors which are interconnected to switch on and off in inverse relation, whereby the transistors, in response to switching of the radiation sensitive element, switch between on and off conditions and cause sequential magnetic build up and collapse of the field in the primary windings of the ignition coil.*

The radiation sensitive element may be either a photo-transistor or it may be an amplifying element, such as a silicon photo Darlington amplifier.

The opaque element having at least one aperture therein may be in the form of a cup having one or more holes or slots (the number of such holes or slots depending on the number of cylinders). In the case where slots are provided, these may be inclined to the axial direction of the cup and means may be provided for displacing the axial position of the cup relative to the radiation source and radiation sensitive element in order to obtain an advance or retard of the ignition system. The advance or retard of the ignition timing may be achieved by either vacuum, electrical or centrifugal methods. In one preferred form the means for displacing the cup may include a resilient annular disc shaped member symmetrically split to provide two inner peripheries which engage with the ends of two shafts, one shaft being driven by the engine and the other shaft being connected to the cup, means being provided to enable the second shaft to move longitudinally with respect to the first shaft and yet be rotationally keyed therewith.

BRIEF DESCRIPTION OF DRAWINGS

The present invention will now be described in greater detail by way of example with reference to the accompanying drawings, wherein:

FIG. 2 is a circuit diagram showing one form of transistorized ignition [system] *circuit* which responds to the output from the photo-transistor of the device shown in FIG. 1;

FIG. 4 diagrammatically shows a second preferred form of obtaining an advance or retard of the ignition utilizing the partial vacuum created above the throttle valve of the engine;

FIG. 5 is a circuit diagram showing a third method of obtaining an advance or retard of the ignition utilizing the drop in voltage across the primary winding of the coil or ballast resistor;

FIGS. 6A and 6B are respectively a perspective view showing an alternative form of opaque element used in the device; and FIG. 7 diagrammatically shows a fourth method of obtaining an advance or retard of the ignition utilizing the partial vacuum principle and the opaque element shown in FIG. 6.

DESCRIPTION OF PREFERRED EMBODIMENTS

Figure 1:
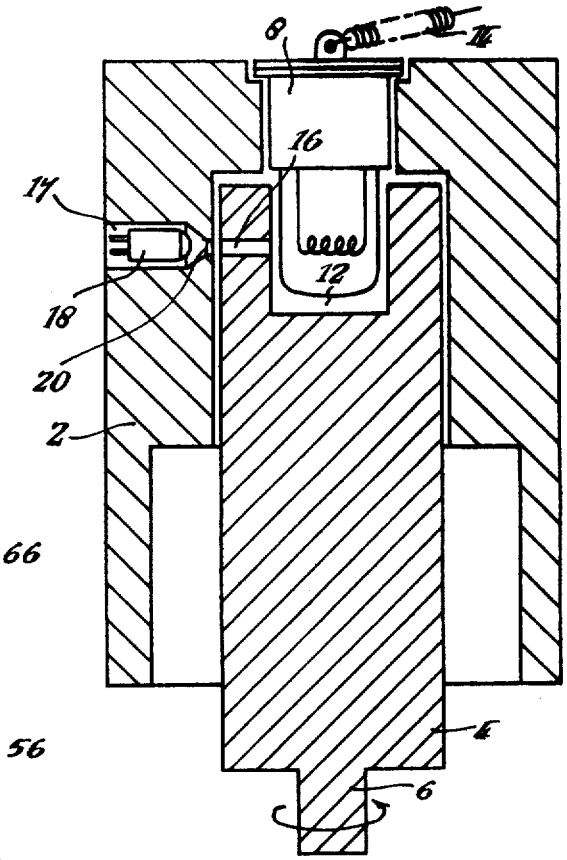
FIG. 1 diagrammatically shows one preferred form of device for fast switching the primary circuit of an ignition system of an internal combustion engine in order to produce high voltage discharge at the required firing point of the engine.

Referring to FIG. 1 of the drawings, the device comprises a stator 2 surrounding a rotor 4. The rotor 4 is connected to the cam shaft of the engine through the shaft 6. Centrally located in the top of the stator 2 there is provided a radiation lamp holder 8 containing a gallium arsenide infra-red source 10. The infra-red source 10 projects inside a cylindrical cup 12 which is bored axially into the top of the rotor 4. The infra-red source 10 is derated by being connected in series with a resistor 14. The annular wall of the rotor 4 in the region of the cylindrical cup 12 has a small circular hole 16 bored in it.

In a chamber 17 in the wall of the stator 2 there is arranged a photo-transistor or radiation sensitive semiconductor device 18. The chamber 17 in which the photo-transistor 18 is housed has an aperture 20 which is at the same height as the hole 16 in the rotor 4.

In operation, each time the rotor 4 rotates the hole 16 comes into alignment with the aperture 20 for a given number of degrees of engine rotation. During this period radiation from the infra-red source 10 is received by the photo-transistor 18 which thereby causes its energization and current flow which is thereafter amplified by a transistorized ignition circuit. In the example illustrated there is only one hole 16 so the device is only applicable to a single cylinder engine. For a four cylinder engine, four holes 16 are provided at 90° intervals around the wall of the rotor 4, and for a six cylinder engine, six holes are likewise provided at 60° intervals.

In order to achieve an advance or retard of the ignition system to allow for different engine speeds, the holes 16 may be replaced by slots which are inclined to the axial direction of the cup. The rotor 4 is adapted to be axially moved in relation to the stator 2 between one extreme position at slow engine revolutions where the radiation from the infra-red source 10 passes through the upper part of the slot to reach the photo-transistor 18 to another extreme position at high engine revolutions where the radiation from the source 10 passes through the lower part of the slot to reach the photo-transistor 18. The slots may be tapered in one direction for a reason which will be explained later.

The above described device has the advantage over known systems of switching in timed relation to the engine revolutions that it is extremely accurate and mechanically reliable in that the only moving part is the rotor. Due to the provision of the resistor 14 in series with the supply to the infra-red lamp 10, the latter by being run in a derated condition has an extremely long life, so that electrical failure of the device is rare.

Moreover, the device shown in FIG. 1, satisfies the necessary requirements for the primary section of an ignition distributor, because (a) The firing point of each cylinder in relation to the engine and each other, can be [vary] *very* closely controlled. A firing point accuracy of $\pm\frac{1}{2}°$ is easily obtainable in mass production by indexing the shaft for drilling the holes at the angular spacing required for the appropriate number of cylinders.

(b) The device has no inherent limits such as those due to the inertia of high speed contacts or incorrect spring tension of contact sets, mechanical wear of rubbing blocks, contact point wear, and oxidation.

(c) As a triggering unit for transistorized ignition systems it can be substituted for the conventional electro-magnetic pulse generator which suffers from the limitation of fixed timing when changes in speed or load demand otherwise.

(d) The use of a displaceable inclined slot in the cup of the rotor enables a satisfactory advance or retard of the ignition timing to be achieved over a wide range of speeds and/or loads.

Figures 2, 6B:
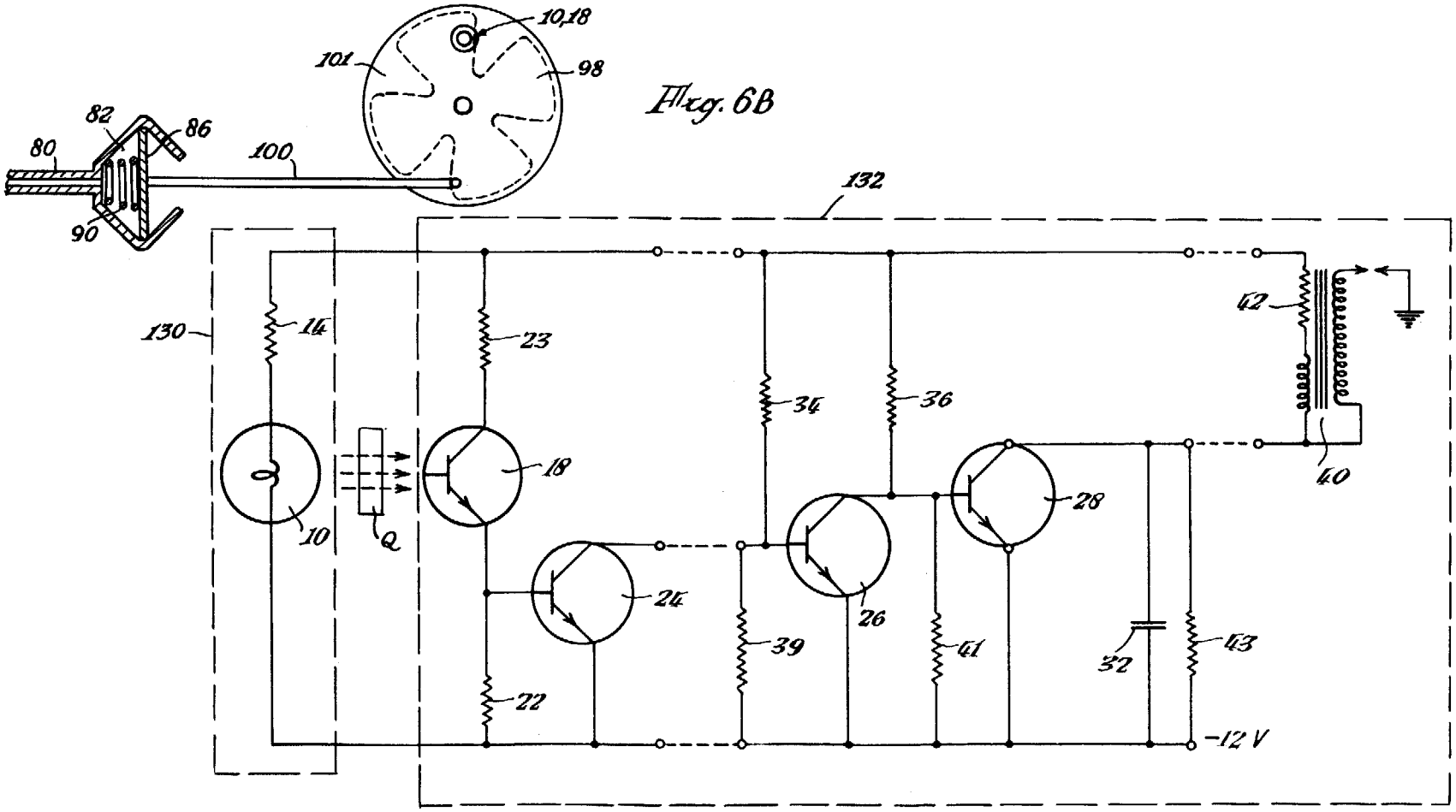

Referring now to FIG. 2 of the drawings, the transistorized ignition circuit for an internal combustion engine is divided into three parts which are interconnected by cables, the third part consisting of a fast rise ignition coil. The first part is the primary distributor and includes an infra-red radiation source 10, for example, a gallium arsenide infra-red lamp in series with the 100 ohm resistor 14 across the 12 volt battery of the vehicle. Also across the battery of the vehicle is a silicon planar photo-transistor 18 in series with a 470 ohm resistor 22 and a 300 ohm limiting resistor 23. This photo-transistor is energized by the infra-red radiation from the source 10 passing through the hole 16 or a slot cut in the cylindrical cup 12, and which is rotated by the crank shaft of the engine. The block Q diagrammatically illustrates an opaque element which may be either the cylindrical cup arrangement shown in FIG. 1 or the disc 98 shown in FIG. 6A to be described later on. The output from the photo-transistor 18 is [amplified by a] *fed to the base electrode of a first switching transistor 24.*

The second part of the circuit is the transistorized ignition unit and includes a [fast inverse] *second* switching transistor 26, a high voltage power transistor 28, a 500 $\mu\mu$f. capacitor 32 which acts as a high frequency shunt and resistors 34 and 36. The output from the transistor 24 is applied to the base electrode of the transistor 26, whose output is in turn applied to the base electrode of the power transistor 28. The third part of the circuit includes the ignition coil 40 and a ballast resistor 42 in series with the primary winding. Resistors 39, 41 and 43 are provided to prevent stray high frequency interference.

The circuit of FIG. 2, operates as follows. When the hole or aperture in the rotor element comes into alignment with the infra-red lamp 10 and photo-transistor 18, the photo-transistor conducts. The current which then flows through the resistors 22 and 23 and photo-transistor causes base current to flow in the transistor 24 which instantly switches on. As soon as the transistor 24 conducts, the current which flows through its emitter-collector circuit fully bottoms the base electrode of the transistor 26 which instantaneously switches off. Since the transistor 26 is not conducting, full base current flows in the power transistor 28 which switches on. At the end of the dwell period which ensures full magnetic saturation of the fast rise coil, the magnetic collapse phase begins at the instant the infra-red radiation is cut-off from the photo-transistor 18. When the radiation ceases the photo-transistor 18 cuts-off the current flow in the resistor 22, and the corresponding fall in potential switches the transistor 24 off. This causes the potential at the base electrode of the transistor 26 to rise and switch the transistor on. The base electrode of the power transistor 28 is shorted to $-12$ volts which causes the power transistor to be switched off very fast to produce very high secondary voltage in the ignition coil.

*As will be clear from the above description, the ignition circuit has two stable states depending whether the photo-transistor 18 is energized or de-energized. That is, one stable state exists when the photo-transistor 18 is energized and the transistors 24 and 28 are "on" or conductive and the transistor 26 is "off" or non-conductive. The other stable state exists when the photo-transistor 18 is de-energized and the transistors 24 and 28 are "off" or non-conductive and the transistor 26 is "on" or conductive. Also, the switching of the transistors 24, 26 and 28 in inverse relation to one another insures that there is always at least one transistor which is fully conductive and any transient voltage in the ignition circuit is safely conducted to ground through the conductive transistor(s), thereby preventing the non-conductive transistor(s) from being damaged or broken down.*

In order to increase the dwell percentage period during which the ignition system is switched on at high speed in relation to a complete revolution of the crank shaft, the slot or slots which are cut in the cylindrical cup of the rotor may be tapered to increase in size towards the high revolutions end of the slot. As stated above, the slot or slots may be inclined with respect to the vertical or curved to achieve an advance or retard of the ignition system to allow for different engine speeds.

It is well known that ignition timing must be advanced with engine speed and also changed according to load on the engine, the maximum advance being provided at light loads and at high speeds. There are a number of ways in which this can be achieved the most important of which are as follows:

(a) Vacuum, (b) Electrical, and (c) Centrifugal

In the first case use is made of the partial vacuum created in the inlet manifold of the [carburetter] *carburetor* upstream of the throttle valve to control the advance and retard mechanism. In the second case use is made of the voltage [drap] *drop* across the ignition coil to control the advance and retard mechanism since there is a direct relation between the voltage drop and the speed of the engine. In the third case use is made of centifugal force which is also related to engine speed. The last two methods can only be used in conjunction with engine speed, but the vacuum method can also be applied to compensate for load variations as well as speed variations. The embodiment illustrated in FIG. 7 is an example of a system in which the advance and retard of the ignition system is achieved by the interaction of speed and load.

Figure 3:
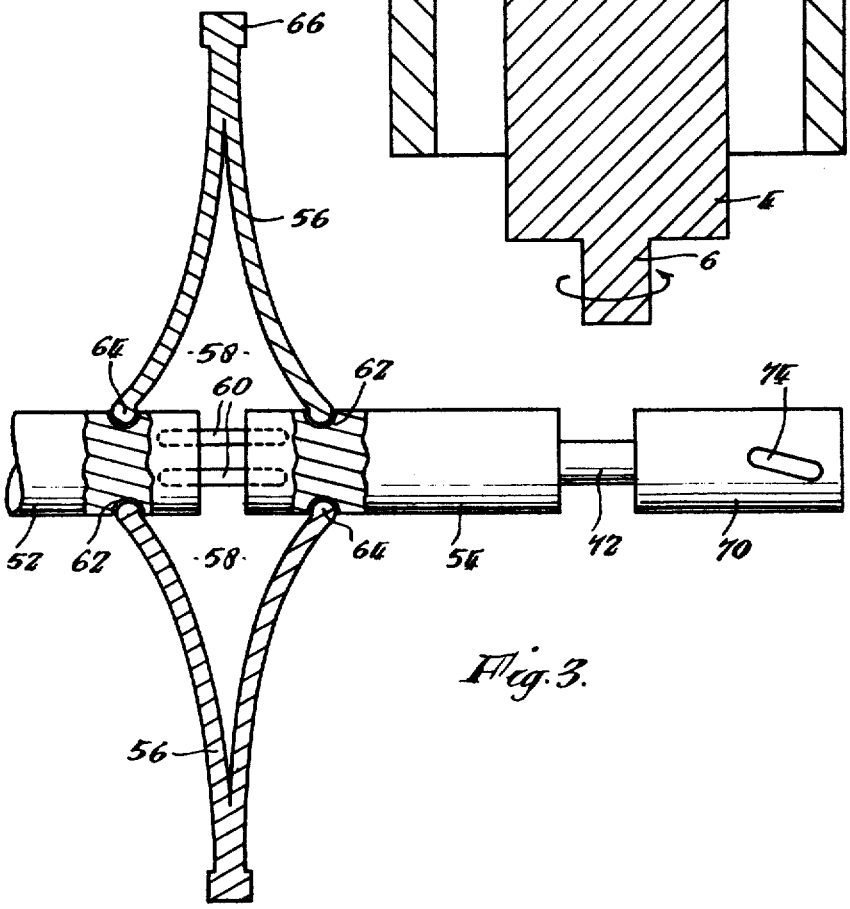
FIG. 3 diagrammatically shows one preferred form of device for axially displacing the rotor cup with respect to the stator for obtaining an advance or retard of the ignition.

An example of a preferred form of advance and retard ignition timing device of the centrifugal type is diagrammatically illustrated in FIG. 3. The device comprises a shaft 52 directly coupled to the engine, a similar shaft 54 rotationally keyed with respect to the shaft 52 but slidable longitudinally with respect thereto, and a resilient annular disc shaped member 56 which is symmetrically split to form two inner peripheries and to provide two spaces 58 which are caused to expand or contract according to the speed of the engine.

The two shafts 52 and 54 are rotationally coupled together by means of pins 60 which are slidable in bores in the shafts to enable the shaft 54 to move longitudinally with respect to the shaft 52. The [discs] *disc* 56 has a central aperture through which the ends of the two shafts pass. Each shaft has a peripheral groove 62 cut therein near the ends thereof and annular projections 64 at the two inner peripheries of the disc 56 fit into and are held therein. The disc 56 is made such that the two inner peripheries thereof want to move away from each other to separate the two shafts 52 and 54 when there are no other forces acting on the disc. At the outer periphery of the disc there is a thickened or heavier part 66.

The shaft 54 is coupled to a cup shaped rotor 70 by means of a shaft 72. The rotor 70 has slots 74 cut therein, these slots 74 being inclined to the axial direction of the rotor in order to provide the necessary advance and retard of the ignition system.

At low engine revolutions, the disc 56 urges the shaft 54 to its furthest position from the shaft 52, so that the radiation from the infra-red source within the stator shines through the left hand end of the slots 74. As the engine speed increases, the disc tends to flatten itself by centrifugal forces and draws the shaft 54 towards the shaft 52. The rotor 70 is moved in relation to the stator and the light appears to move along the slots 74. At maximum engine revolutions the shaft 54 is drawn right in and the light shines through the right hand end of the slots 74.

Referring now to FIG. 4 of the drawings, which diagrammatically shows a second way of obtaining an advance or retard of the ignition by utilizing the changes in pressure in the inlet manifold of the [carburetter] *carburetor*, a pipe 80 interconnects a chamber 82, with the inlet manifold of the [carburetter] *carburetor* upstream of the throttle valve 84. The chamber 82 is provided with a diaphragm 86 to which is connected a rod 88 carrying at its other end the photo-transistor 18. A spring 90 is provided within the chamber 82 to urge the diaphragm to its neutral position against the partial vacuum produced in the chamber. The drawing also illustrates the rotor cup 70 and an inclined slot 74 therein. When the throttle valve 84 is fully closed the diaphragm in its normal position and the phototransistor 18 co-operates with the infra-red lamp through the bottom of the slot. As the engine speeds up, a partial vacuum is created in the chamber 82 and this causes the diaphragm 86 to move inwards against the pressure of the spring 90, thus moving the photo-transistor to the left in order to advance the ignition.

Referring now to FIG. 5 which shows a preferred form of device utilizing the electrical method of advancing or retarding the ignition, the circuit diagram includes the primary winding of the ignition coil 40 and the ballast resistor 42. A circuit including a capacitor 92 and an induction coil 94 connected in parallel, can be connected either across the primary winding of the coil 40 or across the ballast resistor 42. The induction coil is provided with a displaceable central soft iron core 96, arranged so that one end projects from the coil 94 and carries the photo-transistor 18. The other end extends into the induction coil 94 and is biased by means of a spring 95 which in the de-energized position of the coil permits only part of the core 96 to be positioned within the coil 94. When the engine is running at a slow speed, there is maximum voltage across the primary winding of the ignition coil 40 or ballast resistor 42 so the core 96 is fully sucked into the coil 94 against the action of the spring. As the speed of the engine increases the current through the primary winding of the ignition coil decreases which means that the voltage across the coil 94 is decreased. This results in less attractive force and the core 96 is urged to move slightly out of the coil 94 by the spring, which causes an advance of the ignition.

Instead of using the rotor cup with apertures therein to achieve the correct timing, one may use a disc shaped device substantially in the form of a a Maltese cross, to act as the opaque element. Referring to FIG. 6 a disc 98 having a number of V-shaped slots 99 cut out of it at equi-spaced intervals therearound (the number of V-shaped slots being equal to the number of cylinders) is mounted on a shaft 97 driven from the engine. The infra-red lamp 10 and the photo-transistor 18 are placed on either side of the slotted disc 98, so that on revolution of the disc, the photo-transistor is energized from the infra-red radiation every time a V-shaped slot comes into align with the lamp 10 and photo-transistor 18. Since the edges of the V-shaped slots are not quite radial, advance and retard of the ignition system can be achieved by moving the line of sight between the lamp 10 and the photo-transistor 18 radially inwards or outwards. By making the blades substantially rectangular in shape, a large advance or retard can be achieved for only a small movement of the line of sight between the lamp 10 and the photo-transistor 18. To achieve the movement of the line of sight between the lamp 10 and the photo-transistor 18, each is mounted on a disc 100 between which the disc 98 rotates. The two discs 100 are coupled to a diaphragm 86 by rods 101. As in the example described in FIG. 4, the diaphragm 86 is mounted in a chamber 82 which is in communication with the inlet manifold of the [carburetter] *carburetor* by a pipe 80. The spring 90 maintains the diaphragm straight against the action of the vacuum produced in the chamber 82. As the pressure in the chamber 82 increases or decreases so the discs 100 are rotated slightly one way or the other with respect to the disc 98 and thus vary the line of sight of the infra-red source 10 and the photo-transistor 18 in relation to the rotating disc 98 to achieve an advance or retard of the ignition.

At this point in the description it would be helpful to summarize the general principles by which advance and retard is achieved. In the case of the equipment disclosed in the present invention where there is a given line between the infra-red lamp 10 and the photo-transistor 18, then any relative motion between that line and the leading edge of the rotor blade will produce a change in ignition timing. Similarly, the section of disc being used may have the leading edge of its blades (i.e. the pieces between the V-shaped slots 99) modified in shape so as not to be radius of the disc so that any motion of the line between the infra-red lamp 10 and the photo-transistor 18 relative to or across the disc will produce a change in ignition timing.

FIG. 7 diagrammatically illustrates one preferred embodiment of an ignition timing device utilizing the vacuum principle to advance or retard the ignition according to speed and load. The device includes a V-shaped slotted disc 98 driven from the engine. Mounted on the sides of a beam 100 are the infra-red lamp 10 and the photo-transistor 18, the beam being arranged so that the blades of the disc interrupt the radiation path as the disc rotates. Each end of the beam 100 is pivotally secured to one end of respective guided rods 102 and 104. The other ends of these rods are connected to diaphragms 106 and 108 of respective bell-shaped chambers 110 and 112. The chamber 110 is connected to the venturi 115 of the carburetor of the engine by a pipe 114, whilst the chamber 112 is connected to the inlet manifold of the carburetor upstream of the throttle valve 84 by a pipe 116. Springs 118 and 120 resist the movement of the diaphragm against the pressure created by the partial vacua in the respective system. For ease in correlating FIGS. 2 and 7, the portions of the circuit of FIG. 2 enclosed within dashed lines and denoted 130 and 132, respectively, are also shown in FIG. 7, these portions being shown in FIG. 7 as made up of lamp 10 and source circuit 10A (shown in block form) and photo-transistor 18 and transitorized ignition control system and ignition coil 18A (also shown in block form), respectively.

In the above system, it will be appreciated that an advance or retard of the ignition timing will be achieved either in response to the [peed] *speed* alone, or to the load on the engine alone, or as a combination of speed and load conditions.

What I claim and desire to secure by Letters Patent is:

1. A device for providing rapid switching of the primary circuit of an ignition coil of an internal combustion engine to thereby induce a desired voltage in the secondary circuit *of the ignition coil, said device* comprising a photo-transistor sensitive to infra-red radiation which will switch on or conduct when exposed to the radiation and switch off when the radiation is cut off; a gallium arsenide lamp emitting infra-red radiation; an element which is opaque to infra-red radiation positioned between the gallium arsenide lamp and the photo-transistor, said opaque element having as many equi-spaced apertures therein as there are cylinders in the engine; means for moving the opaque element in timed relation to the engine revolutions; [an amplifier having first and second transistors connected in cascade to the output of the photo-transistor and arranged to switch in inverse relation to one another so that at any one time a transistor is always conducting; and a power transistor connected to the output of the amplifier to be switched in inverse relation to the second transistor of the amplifier and connected in circuit relationship with the ignition coil such that each time a beam of infra-red radiation is cut off from said photo-transistor, the transistorized amplifier circuit causes] *and a switching circuit interconnecting the photo-transistor with the ignition coil and including a first transistor connected to the output of the photo-transistor, a second transistor, and a power transistor connected to the primary circuit of the ignition coil, the first, second and power transistors being interconnected in a manner such that adjacent ones switch on and off in inverse relation to one another and such that at least one is conducting at any one time, whereby the switching circuit, in response to each time a beam of infra-red radiation is cut off from the photo-transistor causes* rapid switching of the primary circuit and a resultant production of the desired voltage in [said] *the* secondary circuit.

2. A device for providing rapid switching of the primary circuit of an ignition coil of an internal combustion engine to thereby induce a desired voltage in the secondary circuit *of the ignition coil, said device* comprising a radiation sensitive element which will switch on or conduct when exposed to radiation and switch off when the radiation is cut off; a solid state *infra-red* radiation source; a cylindrical cup forming part of a rotor enclosing the radiation source; at least one inclined slot in said cup; means for rotating the cup in timed relation to the engine revolutions; means for displacing the radiation sensitive element relative to the slot in the cup and thereby the line of sight between the radiation source and the radiation sensitive element so as to achieve an advance or retard of the ignition timing; [a transistorized ignition circuit including an amplifier having at least two transistors connected in cascade to the output of the radiation sensitive element and arranged to switch in inverse relation to one another; and switching means connected to the output of the amplifier means and associated with the ignition coil, said transistorized ignition circuit causing rapid switching of the primary circuit, and the resultant production of the desired voltage in the secondary circuit, responsive] *and a switch circuit interconnecting the radiation sensitive element with the ignition coil and including a plurality of transistors interconnected in a manner such that adjacent ones switch off and on in inverse relation to each other and such that at least one is conducting at any one time, the first of the transistors being connected to the output of the radiation sensitive element and the last of the transistors being connected to the primary circuit of the ignition coil, whereby the switching circuit, in response* to a slot permitting a beam of radiation to fall onto and to be cut off from the radiation sensitive element, *causes rapid switching of the primary circuit and the resultant production of the desired voltage in the secondary circuit.*

3. A device according to claim 2[,] wherein the solid state radiation source comprises a gallium arsenide lamp [which emits radiation in the infra-red region of the electromagnetic spectrum].

4. A device according to claim 2[,] wherein said switching [means comprises a power transistor] *circuit includes two n-p-n transistors having commoned emitter electrodes and an n-p-n power transistor having its collector electrode connected to one end of the primary circuit of the ignition coil.*

5. A device for providing rapid switching of the primary circuit of an ignition coil of an internal combustion engine to thereby induce a desired voltage in the secondary circuit *of the ignition coil, said device* comprising a radiation sensitive element which will switch on or conduct when exposed to radiation and switch off when the radiation is cut off; a solid state infra-red radiation source; a disc having as many substantially V-shaped slots cut therein in equi-spaced relation around the circumference as there are cylinders in the engine, said disc being positioned between the radiation source and the radiation sensitive element; means for rotating the disc in timed relation to the engine revolutions; means for moving the line of sight between the radiation source and the radiation sensitive element through the slots in the disc so as to achieve an advance or retard of the ignition timing; [a transistorized ignition circuit including an amplifier having at least two transistors arranged in cascade and fed from the output of the radiation sensitive element so as to switch rapidly in inverse relation to one another; and a power transistor fed from the output of the amplifier means and feeding the ignition coil, said transistorized ignition circuit causing a switching action to effect] *and a switching circuit interconnecting the radiation sensitive element with the ignition coil and including a plurality of transistors interconnected in a manner such that adjacent ones switch on and off in inverse relation to each other and such that at least one is conducting at any one time, the first of the transistors being connected to the output of the radiation sensitive element and the last of the transistors being connected to the primary winding of the ignition coil, whereby the switching circuit causes* the sequential magnetic build up and collapse of the field in the primary winding of the ignition coil responsive to a slot permitting a beam of infra-red radiation to fall on and be cut off from the radiation device, said collapse of said field resulting in the production of the desired voltage in the secondary circuit.

6. A device according to claim 5[,] wherein the radiation source and the radiation sensitve element are each mounted at the end of a member the ends of which are movable in relation to the disc to cut the line of sight between [said] *the radiation source and the radiation sensitive* [elements] *element*, one end of the member being moved in response to engine speed and the other in response to load.

7. A device according to claim 5[,] wherein the radiation source and radiation sensitive element are each mounted at the end of an elongate member, *and said device further includes* means for displacing each end of said elongate *member* including a diaphragm mounted in a chamber respectively connected to the venturi of a carburetor and the vacuum spark port of the carburetor so as to be sensitive to the partial vacua, the ends of said member being pivotally connected to respective diaphragms whereby the ends of said member are respectively moved in response to engine speed and load to thereby vary the timing at which the radiation sensitive element is cut off from the radiation source and hence the timing of the spark in relation to crank position.

8. A device for providing rapid switching of the primary circuit of an ignition coil of an internal combustion engine to thereby induce a desired voltage in the secondary circuit *of the ignition coil, said device* comprising a photo-transistor sensitive to infra-red radiation which will switch on or conduct when exposed to the radiation and switch off when the radiation is cut off; a solid state infra-red radiation source; an element which is opaque to infra-red radiation positioned between the infra-red radiation source and the photo-transistor, said opaque element having as many equi-spaced apertures therein as there are cylinders in the engine; means for moving the opaque element in timed relation to the engine revolutions; means for moving the line of sight between the infra-red radiation source and the photo-transistor through the apertures in the element so as to achieve an advance or retard of the ignition timing; [a transistorized ignition circuit including an amplifier having at least two transistors connected in cascade to the output of the photo-transistor and arranged to switch in inverse relation to one another; and a power transistor connected to the output of the amplifier and connected in circuit relationship with the ignition coil such that each time a beam of infra-red radiation is cut off from said photo-transistor, the transistorized amplifier circuit causes] *and a switching circuit interconnecting the photo-transistor with the ignition coil and including a first transistor connected to the output of the photo-transistor, a second transistor, and a power transistor connected to the primary circuit of the ignition coil, the first, second and power transistors being interconnected in a manner such that adjacent ones switch on and off in inverse relation to one another and such that at least one is conducting at any one time, whereby the switching circuit, in response a beam of infra-red radiation being cut off from the photo-transistor, causes* rapid switching of the primary circuit and a resultant production of the desired voltage in [said] *the* secondary circuit.

9. A device according to claim 8[,] wherein the photo-transistor has its base electrode left unconnected, [and wherein] the [amplifier comprises two] *first and second* transistors *are* of like type, the emitter electrode of the photo-transistor [being] *is* connected to the base electrode of the first transistor, the collector electrode of the first transistor [being] *is* connected to the base electrode of the second transistor, the collector electrode of the second transistor [being] *is* connected to the base electrode of the power transistor, the emitter electrodes of the *first, second and power* transistors [being] *are* commoned and connected to one side of a battery, *each of* the collector electrodes [being] *of the first, second and power transistors is* connected to the other side of the battery [each] through a resistor, and *each of* the base electrodes [being] *of the first, second and power transistors is* connected to the commoned emitter electrodes [each] through *a* further [resistors] *resistor.*

*10. An opto-electronic ignition system for an internal combustion engine including an ignition coil having primary and secondary windings, said system including an infra-red radiation source; a photo-transistor which will switch on or conduct when exposed to infra-red radiation from the source and switch off when the radiation is cut off; an element opaque to infra-red radiation positioned between the radiation source and the photo-transistor and having as many equi-spaced apertures therein as there are cylinders in the engine; means for moving the opaque element in timed relation to the engine revolutions; a first transistor connected to the output from the photo-transistor so as to conduct when said photo-transistor conducts; a second transistor connected to the output of the first transistor so as to switch in inverse relation to the first transistor; and a third transistor connected to the output of the second transistor so as to switch in inverse relation to the second transistor and having an output connected to the primary winding of the ignition coil, whereby, every time radiation is cut off from the photo-transistor, the third transistor is rendered non-conductive to cause a collapse of the magnetic field associated with the primary winding and the resultant induced voltage in the secondary winding produces an ignition spark.*

* * * * *